Patented Jan. 14, 1947

2,414,237

UNITED STATES PATENT OFFICE 2,414,237

COMPRESSOR, TURBINE, AND HEATER ARRANGEMENT FOR POWER PLANTS WORKING WITH A HOT GASEOUS MEDIUM

Konrad Oechslin, Zurich, Switzerland, assignor to Aktiengesellschaft Fuer Technische Studien, Zurich, Switzerland, a corporation of Switzerland Application November 29, 1945, Serial No. 631,601
In Switzerland December 29, 1944

4 Claims. (Cl. 60—59)

In thermal cyclic processes, in which a gaseous working medium describes a closed circuit, subsidiary losses, such as losses of temperature owing to insufficient insulation, losses of pressure in machines, apparatus and pipes, are far more detrimental than in steam power plants for example. All these losses are capable of making an economical realisation of thermal power plants in which a gaseous working medium is employed considerable difficulty, in that the degree of efficiency is dependent to a very great extent on the height of such subsidiary losses to which otherwise little attention has been paid. In order to keep these subsidiary losses down to a low level it is compulsory to keep the velocities of flow in the pipes and apparatus comparatively low which, however, necessarily leads to undesirably large dimensions of these parts of the plant. As a consequence much more expensive material is required, particularly for the transmission of the highly heated driving gases. These phenomena play a prominent part, particularly in plants which are worked on a closed circuit, and in which a driving medium, e. g., air or other gas works under a pressure greater than atmospheric pressure. The above mentioned subsidiary losses which are due to friction in the pipes and apparatus, mean that inter alia the most favourable pressure ratio under which a plant of this kind can be worked, lies within only comparatively narrow limits. Per se it would be desirable in many cases, with a view to improving the theoretical degree of efficiency of the cycle, to depart from the most economical pressure ratio, but the impermissible percentage increase in the pressure and temperature losses militate against such a course.

One way of increasing the thermal efficiency of thermanpower plants of the kind above mentioned consists, amongst others, in the reheating in stages of the working medium after partial expansion in the turbine. This reheating of the working medium is synonymous with the approximation of the actual cyclic process, which takes place in the plant, to the ideal process, that is to say the Carnot cycle. This reheating of the driving medium is however just what frequently causes difficulties not only of a constructive but also of a mathematical nature, because hitherto it has only been possible to realise the reheating by considerably increasing the pressure losses. In this connection it must be remembered that even in steam power plants intermediate superheating, that is to say, a measure which is analogous to the reheating of the working medium in the gas cycle, has up to the present time been only rarely realised. The structural complexity of plants of this kind, particularly that of the boiler, and in the case of plants worked on a gas cycle and with an external supply of heat that of the air heater, acts as a deterrent to the adoption of these measures although desirable theoretically per se, and notwithstanding the fact that the gain in efficiency would be quite considerable. Thus for example, in an aerodynamic thermal power plant comprising a turbine, a compressor, an air heater and a heat exchanger, and which is built in accordance with the state of the art at the present day, that is to say, economically, a twofold expansion in the turbine with intermediate heating of the working medium to the initial temperature of from 600° to 700° for example, affords a gain in thermal efficiency of from 4% to 5% which corresponds to a saving of from 10% to 20% in fuel. When it is taken into consideration how desirable it is to effect improvements of fractional parts of percentages in the consumption of fuel in steam power plants, the above example clearly shows the desirability of a practically realisable proposal for the application of intermediate heating in gas turbine plants.

If a gaseous driving medium, such as air for example, is to be heated again after partial expansion in a turbine, it is necessary to return the air exhausted from the first turbine casing into another part of the air heater and to supply the reheated air which issues from the air heater into a second turbine casing. Such conducting of the driving medium has also to be carried out at high temperatures ranging possibly between 500° and 700° C. At the same time great losses of heat naturally occur, if the pipes are too large. In order to prevent such losses, a great expenditure of insulating material is necessary, or, if it be desired to build on a smaller scale, the velocity of flow in the admission and exhaust pipes must be greatly increased, which would compulsorily lead to such great pressure losses that the thermal gain from intermediate heating would, in practical cases, be lost again.

The object of the present invention is therefore to reduce detrimental temperature and pressure losses of the kind herein referred to in thermal power plants, wherein at least the greater part of a gaseous working medium, preferably air, describes a closed circuit, where the part of the current of working medium which is heated indirectly in a heater by a supply of heat derived from an external source, is allowed to expand in at least two turbines, one of which drives a compressor and the other gives up energy externally, and thereby is heated intermediately at least once, and thereafter the expanded current of working medium is again brought in the aforesaid compressor to a higher pressure and subsequently gives up heat in a heat exchanger to that part of the current of working medium which has been re-compressed but not yet heated from an external source. In order to achieve the purpose mentioned, according to the present invention only the turbine which gives off energy externally, together with the machine driven by it, is erected on the floor of the engine house, while the turbine which drives the compressor is placed together with this latter at least at the level of the upper end of the heater for the working medium.

A constructional form of the subject matter of the invention is diagrammatically shown by way of example in the accompanying drawings in which.

Figure 1:
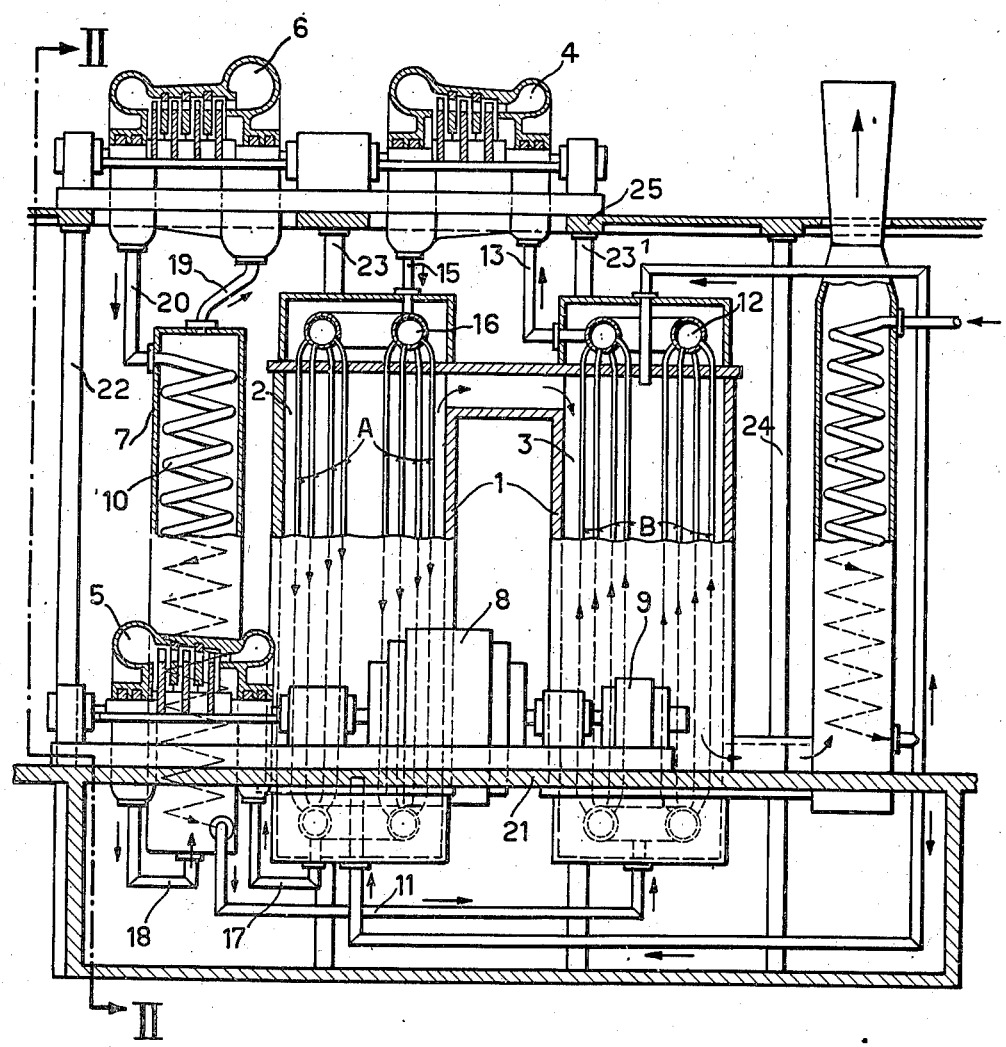
Fig. 1 is a front elevation of a thermal power plant worked by air with two stage expansion and single intermediate heating.
Figures 2, 3:
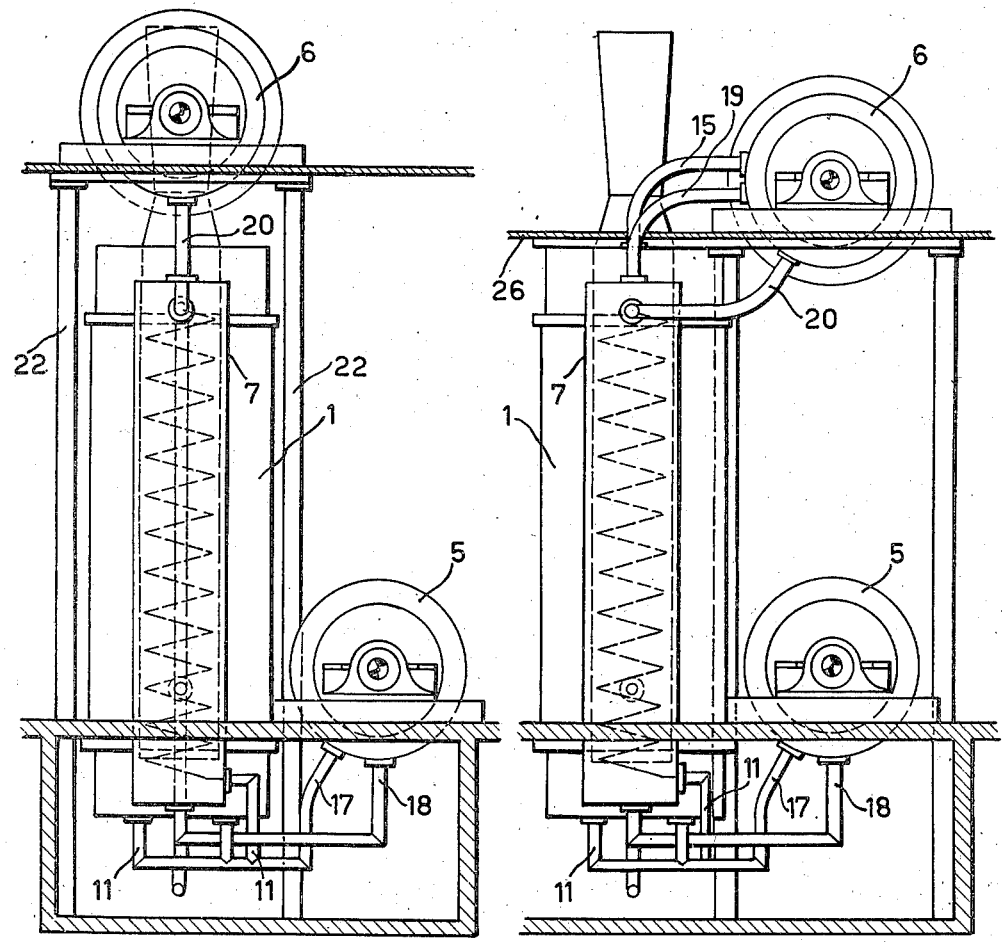
Fig. 2 is a section on the line II—II of Fig. 1.
Fig. 3 shows a side view of a modification of the invention.

In Figs. 1 and 2 the reference 1 denotes the heater, in which heat is to be supplied indirectly from an external source to the air. This heater 1 has two flues 2 and 3 which are arranged in series as regards the direction in which the heating gases flow. In the flue 2 is placed a group of tubes A consisting of two nests and in the flue 3 a group of tubes B likewise consisting of two nests. 4 denotes the high pressure and 5 the low pressure part of a two-casing turbine. The high pressure turbine 4 runs at a higher speed than the low pressure turbine 5 and it drives a compressor 6, in which the air describing the circuit is re-compressed after expansion has taken place and after it has given up heat in a heat exchanger 7 which is arranged vertically next to the heater 1. The low pressure turbine 5 drives a consumer of useful output constructed as a generator 8. 9 denotes a group which serves for starting up the plant. The nature of the arrangement is such that only the machine group consisting of the low pressure turbine 5 and the generator 8 is erected on the floor 21 of the engine house, while the high pressure turbine 4 which drives the compressor 6 is arranged together with this latter above the air heater 1 proper, these elements being carried on a supporting frame 22, 23, 23¹, 24, 25.

The current of working medium which leaves the compressor 6 passes through a pipe 20 into a coil 10 of the heat exchanger 7, heat being given up thereto as it flows through this coil 10 by the current of working medium which after expansion flows likewise through this heat exchanger 7 and passes thereafter into the compressor 6. The working medium current issuing from coil 10 passes through a pipe 11 into the group of pipes B in which it is heated by an indirect supply of heat, derived from an external source, to the temperature required at the inlet of the high pressure turbine 4. The connecting pipe between a header 12 provided at the upper end of the group of pipes B and the high pressure turbine 4 is denoted by 13. The working medium current expanded in this turbine 4 passes through a pipe 15 into a distributor 16 arranged at the upper end of the group of pipes A and is then intermediately heated in this group of pipes A.

The intermediately heated working medium current passes through a pipe 17 into the low pressure turbine 5, and after expansion has taken place therein through a pipe 18 into the heat exchanger 7, in which it gives up heat to the working medium current flowing through the coil 10, to pass over finally out of the heat exchanger 7 through the pipe 19 into the compressor 6, the outlet end of which is connected by the pipe 20 already mentioned to the coil 10.

In the above described thermal power plant the pipes 13 and 15 connected to the high pressure turbine 4 and the pipes 17 and 18 connected to the low pressure turbine 5 may be comparatively short. The reason for this is that on the one hand the point at which the heated current of air issues from the group of pipes B and the point at which the air issuing from the turbine 4 passes into the group of pipes B, are located as closely as possible to the inlet and outlet ends respectively of the high pressure turbine 4, and on the other hand because the point at which the intermediately heated current of air issues from the group of tubes A is located close to the inlet end of the low pressure turbine 5.

Because the heat exchanger 7 is arranged vertically next to the heater 1 and the points thereof at which the expanded, cooled down current of air issues and the compressed current of air to be heated enters are located close to the compressor 6, the said pipes 19 and 20 are also short, which is also the case as regards the pipe 18 through which the air issuing from the low pressure turbine 5 passes into the heat exchanger 7, because the inlet point in question on the heat exchanger 7 is arranged in the vicinity of the outlet end of the turbine 5.

The above described erection and mutual arrangement of the machine groups, of the heat exchanger and of the air heater consequently render it possible, owing to the short connections between the several parts of the machines and apparatus, to reduce the pressure and heat losses to a minimum and therefore make intermediate heating economical for the first time. The thermal power plant herein described also possesses the advantage that a machine foundation for the compressor group and the turbine which drives it is rendered unnecessary, because the supporting frame 22, 23, 23¹, 24, 25 takes over this function. In many cases the compressor is constructed as a specifically high speed machine, e. g., as an axial flow blower, coupled to the high pressure turbine directly. In this way the dimensions of this machine group become comparatively small, so that room can even be found for it on the top platform of the air heater. Such an embodiment of the invention is illustrated in Fig. 3 in which like reference numerals are used to indicate parts similar to those shown in Figs. 1 and 2. In Fig. 3 reference 26 denotes the top platform of the air heater 1. The compressor 6 and its driving turbine, not shown, are arranged on this platform 26 laterally to the heater 1. In this case also however the compressor group is still placed above the upper end of the heater 1 for the working medium.

In addition to the advantage of the absence of complicated admission and exhaust pipes to and from the machines and apparatus there is also the advantage in the thermal power plants described that only a small amount of floor space is necessary for the whole plant. By dividing up the machine group into two groups running independently of each other, and by arranging one of these groups above the air heater, this group may, as a matter of fact, be regarded as a component part of the air heater. The air heater and the compressor together with the driving turbine constitute an operative unit. In front of the air heater there is then in the engine room, just as in steam plants in front of the boiler, merely one turbine which drives a generator or other consumer of useful output.

What is claimed is:

1. Thermal power plant, in which at least the greater part of a gaseous working medium, preferably air, describes a circuit, comprising an engine house; at least one compressor in which the working medium is raised to a higher pressure, installed in said engine house; a heater in which heat is supplied to the working medium, also installed in said engine house; at least two turbines in which heated working medium is expanded and one of which drives said compressor; a consumer of useful output driven by the other turbine, one of said turbines with the engine driven by it being arranged at least at the level of the upper end of said heater, whilst the other turbine together with the engine driven by it is arranged on the floor of said engine house; and a heat exchanger in which a heat exchange takes place between the expanded current of working medium and that part thereof which has been re-compressed in said compressor but not yet re-heated by a supply of heat in said heater.

2. Thermal power plant, in which at least the greater part of a gaseous working medium, preferably air, describes a circuit, comprising an engine house; at least one compressor in which the working medium is raised to a higher pressure, installed in said engine house; a heater in which heat is supplied to the working medium, also installed in said engine house; a least one turbine in which heated working medium is expanded and which drives said compressor, this group of engines being arranged at least at the level of the upper end of said heater; at least one further turbine in which heated medium is also expanded and which drives a consumer of useful output, this second group of engines being placed on the floor of said engine house; a second heater for intermediately heating the working medium issuing from one of said turbines before it passes into the other turbine; and a heat exchanger in which a heat exchanger takes place between the expanded current of working medium and that part thereof which has been re-compressed in said compressor but not yet re-heated by a supply of heat in said first mentioned heater.

3. Thermal power plant, in which at least the greater part of a gaseous working medium, preferably air, describes a circuit, comprising an engine house; at least one compressor in which the working medium is raised to a higher pressure, installed in said engine house; a heater having at least two groups of tubes arranged in different flues and in which heat is supplied to the working medium, this heater being also installed in said engine house; a high pressure turbine in which working medium heated in one of said groups of tubes is expanded and serving to drive said compressor; a supporting frame carrying said group which consists of high pressure turbine and compressor and arranged at least at the level of the upper end of said heater; a low pressure turbine in which the current of working medium intermediately heated in the other one of the two groups of tubes of said heater further expands; a consumer of useful output driven by said low pressure turbine, this group of engines being arranged on the floor of said engine house and the point at which the heated current of working medium issues from one of said groups of heater tubes and the point at which the current of working medium which is to undergo intermediate heating enters the other group of heater tubes are located close to the inlet and outlet ends respectively of said high prssure turbine, whilst the point at which the intermediately heated current of working medium issues from the second group of tubes is close to the inlet end of said low pressure turbine; and a heat exchanger in which a heat exchange takes place between the expanded current of working medium and that part thereof which has been re-compressed in said compressor but not yet re-heated by a supply of heat in said heater.

4. Thermal power plant, in which at least the greater part of a gaseous working medium, preferably air, describes a circuit, comprising an engine house; at least one compressor in which the working medium is raised to a higher pressure, installed in said engine house; a heater in which heat is supplied to the working medium, also installed in said engine house; a high pressure turbine in which heated working medium is expanded and which drives said compressor; a low pressure turbine in which the working medium issuing from said high pressure turbine and intermediately heated in said heater further expands; a consumer of useful output driven by said low pressure turbine, this latter group of engines being placed on the floor of said engine house, whilst the engine group consisting of said high pressure turbine and said compressor is arranged at least at the level of the upper end of said heater; and a heat exchanger constructed as a tubular counter current apparatus arranged vertically next to said heater and in which a heat exchange takes place between the expanded current of working medium and that part thereof which has been re-compressed in said compressor but not yet re-heated by a supply of heat in said heater, the points on said heat exchanger at which the expanded, cooled down current of working medium and the compressed current of working medium which is to be heated enter, being located as close as possible to said compressor, whilst the point at which the expanded current of working medium which has to give up heat in said heat exchanger, is located on the contrary in the vicinity of the low pressure turbine.

KONRAD OECHSLIN.